3,041,140
PULVERULENT SILICA PRODUCTS
Guy B. Alexander, Brandywine Hundred, Del., assignor to E. I. du Pont de Nemours and Company, Wilmington Del., a corporation of Delaware
No Drawing. Filed Dec. 31, 1956, Ser. No. 631,496
2 Claims. (Cl. 23—182)

This invention relates to processes for producing pulverulent silica products and the products produced, and is more particularly directed to compositions comprising dry, pulverulent silica products having a surface area of from 10 to 60 square meters per gram, the silica being amorphous and substantially in the form of aggregated spheroidal ultimate particles wherein the degree of aggregation is such that the coalescence factor is less than 20 percent, and to processes for producing such products comprising the steps of (a) preparing a dispersion of silica having an aqueous continuous phase and a dispersed phase of dense, substantially spheroidal particles of silica the surface area of which is in the range of 10 to 60 square meters per gram, in which there is present less than 1 percent of silica particles of a size having a surface area greater than 300 square meters per gram, said aquasol being stabilized with sufficient alkali to make the pH of the sol from 7 to 10, (b) lowering the pH of the sol at least to 5, and (c) thereafter removing the water from the sol by drying at a temperature less than 150° C.

Various silica sols have previously been reduced to dryness as by evaporating off the water from an aquasol, but ordinarily the products produced are gritty, highly coalesced, difficult to disperse, and generally unsuited for uses where dispersion is important. Pulverulent products have also been known but in such products there is generally a high degree of coalescence, so that the reticulated structures of which they consist cannot readily be broken down into the ultimate units of which they may be made.

The present invention is concerned with preparing dry silica products which are pulverulent—that is, they are either in the form of very fine powders or readily break up into fine powders under very mild attrition. Such products are readily dispersible, as for instance in organic liquid systems, organic polymers, and in fact in systems generally where the desire is to have the silica dispersed to the ultimate degree possible. These products can be used to produce non-reflecting films.

Now according to the present invention it has been found that by processes which broadly consist of preparing a dispersion of silica having an aqueous continuous phase and a dispersed phase of dense, substantially spheroidal silica particles the surface area of which is in the range of 10 to 16 square meters per gram and in which there is present less than 1 percent of silica particles of a size having a surface area greater than 300 square meters per gram which dispersion is stabilized with sufficient alkali to make the pH from 7 to 10, lowering the pH of the dispersion to at least 5, and removing water from the dispersion by drying it at a temperature less than 150° C., novel, dry, pulverulent silica products can be produced having a surface area of from 10 to 60 square meters per gram, the silica being amorphous and substantially in the form of aggregated spheroidal ultimate particles wherein the degree of aggregation is such that the coalescence factor is less than 20 percent.

The art is already familiar with methods for preparing silica aquasols having an aqueous continuous phase and a dispersed phase of dense, spheroidal particles. One can, for instance, build up the size of particles in an alkalized effluent from an ion-exchange operation by a constant volume evaporation, as more completely described in Bechtold and Snyder U.S. Patent 2,574,902, or one can repeptize a precipitated silica gel by heating under pressure in the presence of alkali, as taught by Neundlinger Patent 1,835,420, White Patent 2,375,738, or Legal Patent 2,724,701. Such repeptization methods, however, tend to give particles of non-uniform size and hence are not preferred.

A particularly preferred method for preparing the starting silica dispersion is by heating to a temperature in the range of 160 to 370° C. an aqueous silica sol which has an electrolyte content equivalent to less than 0.1 N of a salt of a monovalent cation, has a pH of from 3 to 7, contains an amount of alkali such that the total $M_2O:SiO_2$ mol ratio is from 0.0001:1 to 0.002:1 where M is a monovalent cation, and contains from 2 to 20 percent by weight of silica in the form of particles having a surface area of from 200 to 400 square meters per gram, all as more fully described in application Serial No. 631,391, filed concurrently herewith by Joseph M. Rule, Jr., now abandoned.

The particle size of the silica in the starting dispersion is critical—that is, the particles must be of such a size that their average surface area is in the range of 10 to 60 square meters per gram. This range covers particles from 300 to 50 millimicrons average diameter, provided the silica in the dispersion is all in the form of substantially discrete spheroids. This is based on the relationship between particle diameter, D in millimicrons, and surface area, A in square meters per gram $$D=\frac{3000}{A}$$

It is furthermore essential that there be present less than 1 percent of silica particles having a size corresponding to a surface area greater than 300 square meters per gram—that is, smaller than about 10 millimicrons in diameter. It will be understood that when reference is made to a surface area in the range of 10 to 60 square meters per gram the exact surface area will be an average figure depending on the surface area of all the particles present, and the size of the various particles will be distributed over a range. It is preferred that the size distribution be within a relatively narrow range—that is, at least 80 percent of the material should be in the size range from 0.5 to 1.5 times the mean average. It is even more important, however, that the presence of any substantial amount of particles in the low size range, above mentioned, be avoided. For example, sols containing silica particles having a surface area greater than 60 $m.^2/g.$, as well as sols containing a high percentage of 10 millimicron particles, yield coalesced particles when dried. Because of the relationship between particle surface area and coalescence, this invention is limited to products having a surface area less than 60 $m.^2/g.$ The art is familiar with the techniques for determining average specific surface areas and any such method may be employed. Surface area as determined by nitrogen adsorption is a standard method and one which is admirably suited to the purposes of definition in the present case. However, by well-understood techniques of electron microscopy ultimate silica particles in the range of 50 to 300 millimicrons can be readily observed directly in an electron micrograph. Actually, particles of 10 millimicrons and even smaller can be directly observed on electron micrographs, but it will be remembered that the limit of resolution of the electron microscope is of the order of 2 to 3 millimicrons and accordingly it is well to check for the presence of particles smaller than this by nitrogen adsorption surface area data or sedimentation techniques such as employ the ultracentrifuge. Ultracentrifuge techniques are particularly well-suited and accurate for determining particle size distribution over the entire range and can be used therefore to detect the presence of very small particles.

It is desirable that the starting dispersion be stabilized with sufficient alkali to make the pH of the sol from 7 to 10. This is for the purpose of insuring that coalescence will not start prematurely.

Having prepared a suitable starting dispersion as described, the pH of the dispersion is lowered at least down to 5, preferably to the range of 2 to 5. This can be done by acidifying, using such acids as hydrochloric or nitric, but one thereby introduces electrolyte, which may subsequently be objectionable and furthermore has a tendency to catalyze coalescence. Accordingly it is much preferred to lower the pH to the desired range by treating the dispersion with a cation exchanger in the hydrogen form. This takes out the alkali without introducing corresponding anions. The art is familiar with techniques for ion exchange, such techniques with respect to silica sols being described, for instance, in Bird United States Patent 2,244,325. Suitable cation exchange resins are, for instance, available commercially under the names of "Nalcite" CHR or "Dowex" 50.

In a preferred process of this invention the dispersion, either before or after lowering the pH but preferably after, is centrifuged to separate out any undesirable small particles. Thus the dispersion is centrifuged into a fraction containing particles of the size uniformly in the range having a surface area of 10 to 60 square meters per gram and a fraction containing smaller particles. The latter is discarded or returned to the sol-making process for further growth into the desired size range. The force and time of centrifuging can be so adjusted as to give a separation of particles smaller than the desired size. By ultracentrifugation the larger particles can even be caused to form a concentrate from which the supernatant liquid can be poured off or decanted, but even if centrifugation is not carried this far, a suitable fractionation can always be achieved.

After the pH has been lowered, whether or not the dispersion is centrifuged, it can be dried to produce products of this invention by removing the water at a temperature less than 150° C. Thus the water can be boiled off, suitably by vacuum evaporation.

A particularly preferred method for removing the water is by freeze-drying. This technique is well known in the art, being employed, for instance, in the preparation of orange juice concentration. Essentially it consists in freezing the dispersion and thereafter removing the water by sublimation without thawing the frozen material. For instance, the dispersion can be sprayed upon a cooled drum or belt, the frozen material flaked off, and water vapor removed by vacuum evaporation while refrigerating the flake to prevent thawing.

The product produced according to the above-described processes is a dry, pulverulent silica product which is either a powder or is easily disintegrated into a powder under very mild attrition such as rubbing it with a finger. It has a surface area of from 10 to 60 square meters per gram. The silica in it is amorphous and substantially in the form of aggregated spheroidal ultimate particles.

When it is said that the particles are spheroidal, it will be understood that they are substantially in the shape of spheres but not necessarily perfect spheres.

The spheroidal particles are aggregated, but the degree of aggregation is such that the coalescence factor is less than 20 percent, preferably in the range from 0.1 to 10 percent and still more preferably from 0.1 to 5 percent. The coalescence factor is an indication of the extent to which the ultimate particles are joined together. In aggregates where the ultimate particles are very firmly joined together, so that the dry products are pulverized only with difficulty and by such methods as grinding or ball-milling, the coalescence factor is considerably higher than 20 percent. The coalescence factor as an indication of the degree of aggregation of ultimate particles is well understood in the art and is described, for instance, in Alexander et al., United States Patent 2,731,326 at column 12, lines 13 to 17. (See Example 1 for the method.)

The products of this invention are useful as fillers, as for instance, in elastomers such as rubber, plastics, polymeric films and fibers, and in paints.

The silica powders of this invention are useful in preparing non-reflecting films, as on glass. Powders containing particles larger than 200 millimicrons yield films which are grey in color, and are not very effective in preventing the reflection of light from the surface of glass such as lenses. Particles smaller than about 75 millimicrons cannot be employed for the purpose of forming primary reflecting films, presumably because the particles are too much smaller than the wavelength of visible light, so that the films are too thin. However, particles in the range from 50 to 75 millimicrons in size can be employed for modifying the color and hardness of films which are formed from 100 millimicron particles. However, it must be understood that the silica powders which are useful in this manner must consist of silica particles which are discrete in the sense that they are not tightly bounded together, i.e., they should have a coalescence less than 20 percent.

The invention will be better understood by reference to the following illustrative examples:

*Example 1*

One gallon of a silica sol, containing 30% by weight $SiO_2$, the colloidal particles of which were essentially discrete spheres having an average diameter of 15 m$\mu$ as determined from an electron micrograph, and containing 0.33% by weight $Na_2O$ was deionized as completely as possible by treatment with ion-exchange resin. The sol was stirred with a mixture of "Dowex" 50 cation-exchange resin in the hydrogen form and "Amberlite" IR45 anion-exchange resin in the hydroxyl form until the pH of the sol was 3.8 and its specific resistance was 5,000 ohms. The sol was filtered, diluted with 2 parts by weight of distilled water and heated as follows in a stainless steel autoclave: The temperature was raised to 325° C. over a 4.5 hour period and held at this temperature for 5 hours. The sol was then cooled to room temperature over a 3 hour period.

The resulting milk-white sol contained 12% $SiO_2$ and had a pH of 9.2. It was treated with more of the "Dowex" 50 resin until the pH was reduced to 3.1.

The deionized sol was then placed in a round bottom flask and, while rotating the flask to give a layer of sol about ⅛ inch in thickness, the sol was frozen by immersing the flask in a bath of Dry Ice-acetone. While maintaining ice-silica mixture at about −5° C., mixture was placed in a vacuum system and the water removed by sublimation.

The resulting product was a dry, pulverulent silica product having a surface area of 36 m.²/g. An electron micrograph of the product showed that it had a relatively narrow particle size distribution, over 90% of the particles being in the range from 0.5 to 1.5 times the average particle diameter. The particles in the product were amorphous silica and, with the aid of the electron microscope, were shown to consist of aggregates of spheroidal units. The degree of coalescence of the product was found to be 1.5 percent.

Coalescence was determined according to the method given in U.S. Patent 2,731,326, column 12, lines 24 and following, except that the percentage transmission of the silica-water dispersion was measured at a wavelength of 700 millimicrons instead of 400. Detection of the silicomolybdic acid complex was measured in the usual way.

A useful characteristic of powders of the type described in the above example is that they can be rubbed onto the surface of glass to form films of surprisingly uniform thickness which can cause interference phenomena in reflected light, and which can be employed as a new and practical method of applying non-reflecting coatings to the surface of glass.

The surface of the glass should be thoroughly cleaned, so that it is free from grease. A drop of water applied to the glass should spread on the surface, indicating that the surface of the glass is clean and hydrophilic. The silica powder should be rubbed on the surface with a soft pad fully loaded with the powder, so that the surface is essentially in contact with a mass of the silica powder and not with the substance of the pad. The powder can be applied to the surface with the tip of the finger, if the area is small. Only light pressure is needed, and the powder rubs out to a film which can be seen immediately when examined in reflected light. The surface of the glass is best held in a horizontal position and observed by looking downward at it to note the reflection of an overhead light or of the sky. The powder is best applied by starting at one spot and rubbing outward with a circular movement away from this spot as the film develops.

When a piece of clean glass was rubbed uniformly with the powder of Example 1, a uniform film of dark purplish-bronze color was deposited.

*Example 2*

A 1,430 gram sample of sodium silicate containing 28.4% $SiO_2$ and having a weight ratio of $SiO_2:Na_2O$ of 3.25 was diluted to 10 kilograms with distilled water. A 9,640 gram portion of this solution was passed down through a column containing 2.50 liters of "Dowex" 50 cation-exchange resin in the hydrogen form such that the effluent stream at all times had a pH of less than 4. The effluent was added directly as formed to the remaining 360 grams of the dilute sodium silicate solution. The resin column was washed down with 1.40 liters of distilled water, the wash being added to the ion-exchange effluent. The solution at this point contained 3.5% $SiO_2$, had a weight ratio $SiO_2:Na_2O$ of 90, and a pH of 7.9.

This sol was heated in a stainless steel autoclave without agitation to 255° C. over a period of about 3 hours. It was held at 255° C. for 6 hours and then cooled to room temperature at a rate of 30° C. per hour.

This sol was now passed through an ion-exchange column containing 100 milliliters of "Dowex" 50 resin in the hydrogen form and 100 milliliters of "Amberlite" IR4B anion-exchange resin in the hydroxyl form thoroughly premixed. The pH of the effluent sol was 3.5.

A portion of this sol was frozen and dried as in Example 1. The product was a dry pulverulent powder having a surface area of 57 $m.^2/g$. It had a coalescence factor as determined as above described of 3 percent.

There is a definite relationship between size of the ultimate particles and the degree to which silica particles are coalesced when an aqueous silica sol is dried down to a powder. Thus the product of Example 2 has a slightly higher coalescence that the product of Example 1. When an attempt was made to dry products having still smaller particles, it was observed that the coalescence increased rapidly as particle size was further reduced. Products having a surface area greater than about 60 $m.^2/g$. are difficult to dry to powders having a low coalescence factor.

The usefulness of the powder of Example 2 can be shown as follows: The powder was lightly crushed in a small mortar, applied to a paper pad as a heavy layer, and this was then rubbed very lightly over the bronze film formed as above described in Example 1. As the rubbing was continued, the color of the film on the glass was changed from bronze to deep blue. As the pressure was increased, the color changed to a golden yellow, and then to a dark purple. This film reflected much less light than the uncoated glass, and was much more durable than the original film of 100 millimicron particles. The surface of the treated glass was cleaned by rubbing it with moist cleansing paper without removing the film. The film was unaffected by rubbing with the finger.

*Example 3*

The dry powder prepared in Example 1 was heated in an oven at 150° C. for 1 hour. Thereafter the product had a coalescence factor of 4%. It was a readily dispersible material.

When treated in an oven at 400° C., the coalescence factor rose to 20% and the resulting product was more difficult to disperse. Products with a coalescence factor greater than 20% are usually gritty and when rubbed on glass do not form good non-reflecting films.

*Example 4*

The preparation in Example 1 was repeated, except that a temperature of 355° C. was used in the autoclave for 5 hours. The resulting dry powder had a surface area of 18 $m.^2/g$.

I claim:
1. A dry, pulverulent silica product having a surface area of from 10 to 60 square meters per gram, the silica being amorphous and substantially in the form of aggregated spheroidal ultimate particles having a coalescence factor of from 0.1 to 10 percent.
2. A dry, pulverulent silica product having a surface area of from 10 to 60 square meters per gram, the silica being amorphous and substantially in the form of aggregated spheroidal ultimate particles having a coalescence factor of from 0.1 to 5 percent.

References Cited in the file of this patent
UNITED STATES PATENTS

| | | |
|---|---|---|
| 2,574,902 | Bechtold et al. | Nov. 13, 1951 |
| 2,577,484 | Rule | Dec. 4, 1951 |
| 2,577,485 | Rule | Dec. 4, 1951 |
| 2,663,614 | Haag | Dec. 22, 1953 |
| 2,731,326 | Alexander et al. | Jan. 17, 1956 |
| 2,741,600 | Allen | Apr. 10, 1956 |
| 2,763,533 | Ashley et al. | Sept. 18, 1956 |